US008069473B2

(12) United States Patent
De Jaegher et al.

(10) Patent No.: US 8,069,473 B2
(45) Date of Patent: Nov. 29, 2011

(54) METHOD TO GRANT ACCESS TO A DATA COMMUNICATION NETWORK AND RELATED DEVICES

(75) Inventors: Jeanne Emmanuelle Rita De Jaegher, Brussels (BE); Erwin Alfons Constant Six, Kalken (BE); Michaël Andries Thomas Beck, Antwerp (BE); Dimitri Papadimitriou, Brussels (BE)

(73) Assignee: Alcatel Lucent, Paris (FR)

( * ) Notice: Subject to any disclaimer, the term of this patent is extended or adjusted under 35 U.S.C. 154(b) by 1503 days.

(21) Appl. No.: 11/067,941

(22) Filed: Mar. 1, 2005

(65) Prior Publication Data

US 2005/0198495 A1    Sep. 8, 2005

(30) Foreign Application Priority Data

Mar. 2, 2004 (EP) .................................. 04290567

(51) Int. Cl.
*G06F 7/04* (2006.01)
(52) U.S. Cl. ............................................................ 726/4
(58) Field of Classification Search .................. 726/4
See application file for complete search history.

(56) References Cited

U.S. PATENT DOCUMENTS

| 6,115,376 A | * | 9/2000 | Sherer et al. | 370/389 |
| 2003/0028808 A1 | * | 2/2003 | Kameda | 713/201 |
| 2003/0065944 A1 | * | 4/2003 | Mao et al. | 713/201 |
| 2003/0152067 A1 | * | 8/2003 | Richmond et al. | 370/352 |
| 2004/0068653 A1 | * | 4/2004 | Fascenda | 713/168 |

FOREIGN PATENT DOCUMENTS

WO    WO01/31843    *    5/2001

OTHER PUBLICATIONS

"IEEE Standard for Local and Metropolitan Area Networks—Port-Based Network Access Control," American National Standard, XX, XX, 2001, pp. 1-134, I, XP002966199.
Rigney C, et al: "RFC2865: Remote Authentication Dial in User Service (RADIUS)." Jun. 2000, XP002205199.

* cited by examiner

*Primary Examiner* — Nasser Moazzami
*Assistant Examiner* — Michael S McNally
(74) *Attorney, Agent, or Firm* — Sughrue Mion, PLLC

(57) ABSTRACT

A method to grant a supplicant access to a data communication network and related devices is claimed. The supplicant is associated to a Medium Access Control address and is coupled to a port of an authenticator of the data communication network. The method includes:
- transmitting an authentication request by the authenticator to an authentication server being coupled thereto;
- making by the authentication server an authentication decision based upon predefined rules and conditions; and
- transmitting by the authentication server to the authenticator an authentication reply that comprises a result of the authentication decision.

9 Claims, 1 Drawing Sheet

METHOD TO GRANT ACCESS TO A DATA COMMUNICATION NETWORK AND RELATED DEVICES

Figure 1:
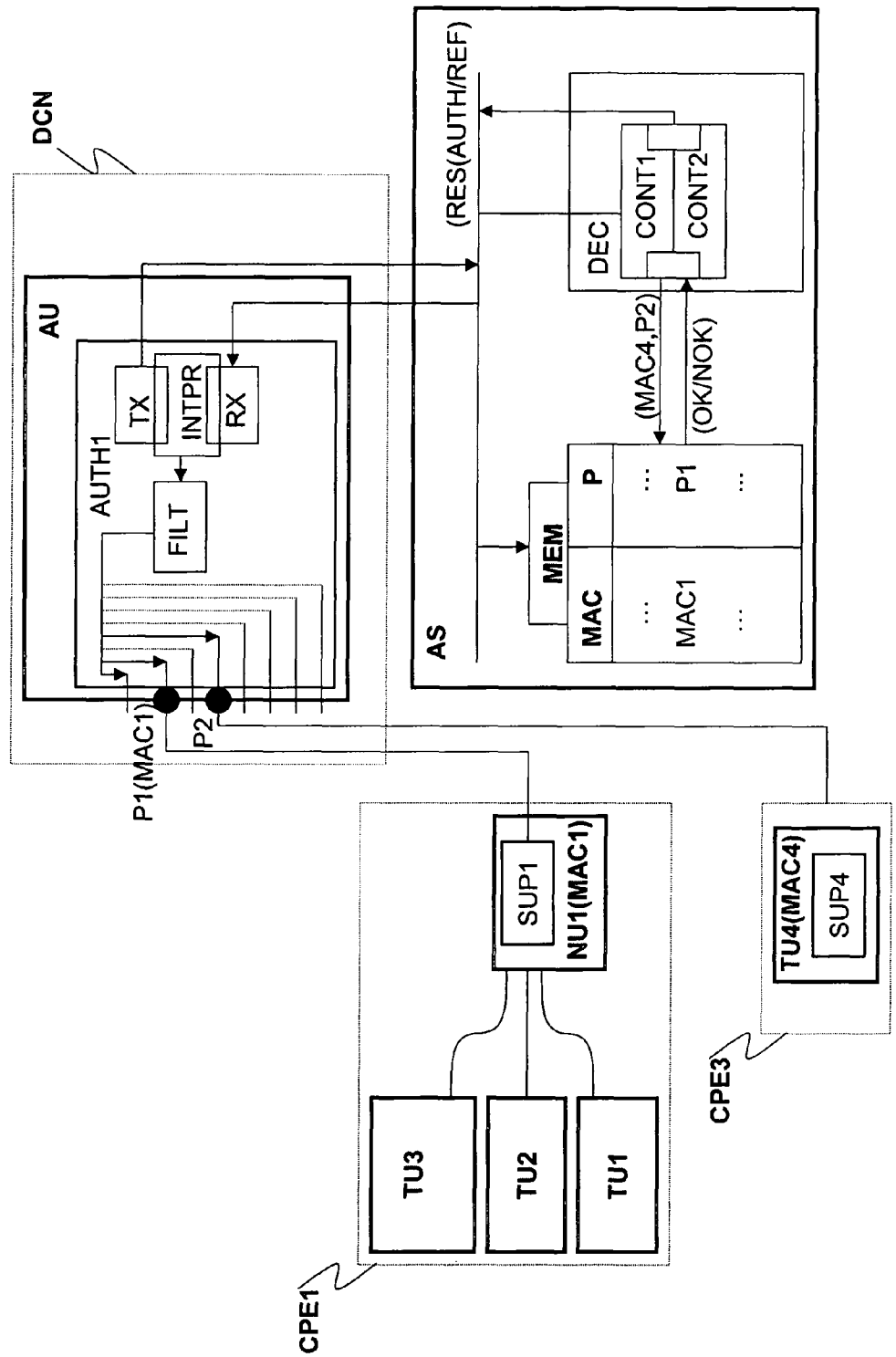

The present invention relates to a method to grant a supplicant access to a data communication network. The present invention relates also to an authentication server and an authenticator that realizes such a method. Such a method and devices are already known from the IEEE Standard 802.1X-2001.

Therein it is described at page 5—§3.1 that a supplicant is an entity at one end of a point-to-point Local Area Network Segment that is authenticated by and authenticator attached to the other end of that link. It has to be remarked that the term supplicant is used in this document in stead of devices such as a peer, which is used in other access control-related specifications.

At page 5—§3.1 it is also described that a Network access port is a a point of attachment of a system to a LAN. It can be a physical port, for example, a single LAN Medium Access Control attached to a physical LAN segment, or a logical port, for example, an association between a station and an access point. It has to be remarked that the term "port" is used in this document as an abbreviation of network access port.

Furthermore it is described that an authenticator is an entity at one end of a point-to-point LAN segment that facilitates authentication of the entity attached to the other end of that link. The authenticator is responsible for communication with the supplicant and for submitting the information received from the supplicant to a suitable authentication server in order for the credentials to be checked and for the consequent state to be determined.

An authentication Server is an entity that provides an authentication service to an authenticator. This service determines, from the credentials provided by the supplicant, whether the supplicant is authorized to access the services provided by the authenticator. The authentication server functions can be collocated with an authenticator, or it can be accessed remotely via a network to which the authenticator has access.

In this way, the method to grant a supplicant access to a data communication network, whereby the supplicant is associated to a Medium Access Control address and is coupled to a port of the authenticator of the data communication network, comprises the following steps:
   a step of transmitting an authentication request by the authenticator to an authentication server being coupled thereto; and
   a step of making by the authentication server an authentication decision based upon predefined rules and conditions; and
   a step of transmitting by the authentication server to the authenticator an authentication reply that comprises a result of the authentication decision.

Furthermore at page 10 of this IEEE Standard 802.1X-2001, it is mentioned that the details of communication between the authenticator and the authentication server are outside the scope of this IEEE Standard 802.1X-2001. However, such communication could typically be implemented by means of an Extensible Authentication Protocol, shortly called herein EAP, connection carried over appropriate higher layer protocols, for example, by means of the EAP RADIUS. Hence the authentication server can be located outside of the confines of the LAN that supports the "EAP over LAN" i.e. the EAPOL, exchanges between supplicant and authenticator; and the communication between the authenticator and authentication server need not be subject to the authentication state of the controlled port(s) of the systems concerned.

In this way, according to this possible implementation, and as it is described by the *IETF RFC* 2865, June 2000—§2 Operation/Introduction, the authentication server, as the RADIUS server, receives the request, it validates the sending client i.e. the authenticator and it consults a database of users i.e. supplicants to find the user whose name matches the request. The user entry in the database contains a list of requirements that must be met to allow access for the user. This mostly includes verification of the password, but can also specify the client(s) of port(s) to which the user is allowed access. Furthermore, at page 6 of this Standard, it is described that if all conditions are met, the list of configurations values for the user i.e. the supplicant are placed into an "Accept" response. These values include the type of service and all necessary values to deliver the desired service. These values may include values such as an IP address, a subnet-mask, the desired compression, and desired packet filter identifiers or desired protocol and host.

The step of making by the authentication server an authentication decision based upon predefined rules and conditions is also described at page 7—IEEE Standard 802.1X-2001 i.e. the authenticator server performs the authentication function to check the credentials of the supplicant on behalf of the authenticator and indicates whether the supplicant is authorized to access the authenticator's services. In this way port-access-control provides an extension to the functionality of a system that offers a means of preventing unauthorised access by supplicants to the services offered by that system. For example, if the system concerned is a MAC Bridge, control over access to the Bridge and the LAN to which it is connected can be desirable in order to restrict access to publicly accessible Bridge Ports, or within an organisation, to restrict access to a departmental LAN to members of that department.

Access control is achieved by the system-enforcing authentication of supplicants that attach to the system's controlled Ports. From the result of the authentication process, the system can determine whether or not the supplicant is authorized to access its services on that controlled Port. If the supplicant is not authorized for access, the system sets the controlled Port State to unauthorized. The mechanisms defined can be applied to allow any System to authenticate another System that is connected to one of its controlled Ports. The Systems concerned include end stations, servers, routers, and MAC Bridges.

It has to be remarked that at page 21—§8.2 Scope—of IEEE Standard 802.1X-2001, it is described that the operation of Port-based Access Control assumes that the Ports on which it operates offers a point-to-point connection between a single supplicant and a single authenticator. It is this assumption that allows the authentication decisions to be made on a per-Port basis. And furthermore that "the authentication of multiple supplicants attached to a single authenticator is outside of the scope of this standard". It has to be explained however that in order not to overload the present description and the present FIG. 1, the authenticator described in the preamble of the claims and in this further description is an integration of a plurality of authenticators as described in the Standard. However, it has to be understood that the authentication decision, in the above-mentioned Standard 802.1X-2001, remains on a per-Port basis. Moreover, the authenticator of the present invention can be implemented according to a distributive way, over the different ports, which brings it back into the one-to-one relation between supplicant and authenticator.

A problem outstanding with this method to grant a supplicant, e.g. SUP4, access to a data communication network will be described now by means of an example. Presume a following topology wherein a first user is using a first customer premises equipment with a first supplicant SUP1 that is coupled to a first port of an access unit P1 that comprises such a authenticator AUTH1; and that a second user is using a second customer premises equipment with a second supplicant SUP4 that is coupled to a second port of this access unit P2. The method to grant the first supplicant SUP1 access to the data communication network DCN of the authenticator, comprises:

- a step of transmitting an authentication request by the authenticator AUTH1 to an authentication server AS being coupled thereto; and
- a step of making by the authentication server AS an authentication decision based upon predefined rules and conditions; and
- a step of transmitting by the authentication server AS to the authenticator an authentication reply that comprises a result of said authentication decision.

As it is described above, the authentication decision comprises a list of requirements that must be met to allow access for the user. This list comprises mostly verification of the password, but can also specify the client(s) of port(s) to which the user is allowed access. Presume that based on the first user's password verification, the first supplicant SUP1 is authorized to get access via the first port P1 of the authenticator to the communication network.

Now, the method to grant the second supplicant SUP4 access to the data communication network of the authenticator comprises similar steps. Based upon the second user's password verification, the second supplicant SUP4 is authorized to get access via the second port P2 of the authenticator to the communication network. However, in the event when the second premises equipment uses a Medium Access Control address e.g. MAC4 being associated to the second supplicant SUP4, which has e.g. by coincidence a same value as the Medium Access Control address MAC1 that is used by the first premises equipment i.e. being associated to the fist supplicant SUP1, the result will still comprise an authentication for this second supplicant. This means that independently of the fact that the Medium Access Control addresses have the same value or not, each supplicant will receive its grant by merely fulfilling the password requirements.

This results in MAC address duplicates and thereby in denial of service and/or service degradation attacks.

Such MAC address duplicates are often solved by solutions in the MAC data plane or the Internet Protocol layer data plane, such as e.g. MAC address translations, VLAN segregation or MAC address registration in the Access node itself.

With the above methods the MAC address duplicates are mostly solved in one access node independently of other access nodes and suppose that MAC address duplicates are rare events since users cannot know each-other MAC address. However, these solutions break down when direct peer-to-peer communication is allowed between users of the same access node and users of different access nodes. When peer-to-peer communication is allowed, users will also know each-other MAC address and therefore any user can steal the MAC address of another. Again, this still results in denial of service and/or service degradation attacks.

An object of the present invention is to provide a method to grant a supplicant access to a data communication network and an authentication server and authenticator performing such a method, such as the above known ones but wherein MAC address duplication in a data communication network is inadmissible.

According to the invention, this object is achieved by means of the method of claim 1, the authentication server of claim 5 and the authenticator of claim 9. Indeed due to the fact that the method further comprises a step of developing by the authentication server a registration memory that comprises entries. One such entry comprises an association between a Medium Access Control address of a granted supplicant e.g. SUP1 and an authenticated port for said granted supplicant that already received a grant to access an allowed data communication network via said authenticated port P1. Furthermore the predefined rules and conditions comprises a first controlling step of controlling the registration memory by means of a first control means of the decision means, upon a presence of a previous entry that comprises a first association between said Medium Access Control address of the supplicant and the port of the authenticator.

Indeed, since the registration memory is built up, all supplicants e.g. SUP1 that received previously an authentication i.e. a grant to access an allowed data communication network are registered in this registration memory by means of an entry that comprises a pair (MAC address being associated to the supplicant; port of the authenticator via which the access is permitted) e.g. (MAC1, P1). Upon reception of a new authentication request from the authenticator by the authentication server for a particular supplicant e.g. SUP4 that desires access, the authentication server first controls for this particular supplicant, the presence of an association-entry i.e. the pair (associated MAC address of the particular supplicant; port of authenticator via which the access is desired) e.g. (MAC4, P2) in the registration memory. The information i.e. associated MAC address of the particular supplicant and the port of the authenticator via which the access is desired is usually to be found in the authentication request of the authenticator.

Besides the execution of the usual rules and conditions, the execution of the first controlling step of the authentication server i.e. taking into account the MAC address—port relation, provides an improved result of the authentication decision i.e. the result now excludes duplication of a MAC address in a data communication network.

Furthermore the authenticator comprises an interpreter to interpret the authentication reply as being received from an authentication server that indeed takes the (MAC address, port) association into account. The interpreter also sets a filter of this authenticator according to the content of the result in the authentication reply. Hereby, in the event when the result comprises an authentication for the port and for the Medium Access Control address whereby the supplicant with the Medium Access Control address was indeed granted to access the data communication network via the port of the authenticator, the filter is set to accept traffic of the supplicant via the port, but only for the specified Medium Access Control address. Similar in the event when the result comprises a refusal for the port and for the Medium Access Control address whereby the supplicant with the Medium Access Control address is denied to access the data communication network via the port of the authenticator, the filter is set to refuse all traffic of the supplicant.

This means that access to a data communication network via a port of the authenticator is granted to a supplicant for only the MAC address for which the authentication procedures was successfully fulfilled. In contrary with known prior art solutions, when an authentication procedure was successfully fulfilled, access via that port was granted for all traffic of the supplicant. The filtering of the traffic excludes that a malicious user would firstly fulfill with success an authentication procedure for its normal MAC address and would secondly use a stolen MAC address to access services in the data communication network via the port of its authenticator. The present application prohibits this.

Furthermore, in the event when the first controlling step, being executed by the authentication server, is positive, the method according to the present invention further comprises a step of generating by the decision means a result that comprises an authentication for the port and for the Medium Access Control address and thereby granting the supplicant with the Medium Access Control address to the data communication network via the port of the authenticator. This means that when a first full match of the requesting pair (MAC address, port) is found in the registration memory, this same (MAC address, port)-pair i.e. this same supplicant at the same port of the authenticator, already received previously a grant to access the communication network. The user of the customer premises equipment of this supplicant desires to access the network again. Permitting access again generates no MAC address duplication and an authentication can be provided. This is described in claim 2.

Furthermore, claim 3 describes that in the event when the first controlling step is negative, the method further comprises a second controlling step, executed by a second control means, of controlling the registration memory upon a presence of previous entry that comprises a second association between the Medium Access Control address of the supplicant with any other port i.e. a check upon a semi-match with an entry of the registration memory. Indeed, the registration memory is controlled upon the presence of the MAC address of the supplicant e.g. SUP4, even when the entry was made in association with another port as the port via which access is requested for the supplicant. In the event when the second controlling step is positive, the method further comprises a step of generating by the decision means a result that comprises a refusal for the port and for the Medium Access Control address and the authentication server thereby denies the supplicant associated with the Medium Access Control address to access the data communication network via the requested port of the authenticator. Indeed, allowing a supplicant with a particular MAC address to access the data network in the event when this MAC address was already previously registered in the registration memory, although at another port, would generate MAC duplication. The presence of the entry in the registration memory of the MAC address in association with another port is has the meaning that either the requesting supplicant has by coincidence the same particular MAC address as already registered or has the meaning that a malicious user has been steeling the particular MAC address and that he tries to use it. In both situations access to the data communication network by the supplicant with this particular MAC address should be avoided. This is realized by comprising a refusal in the result of the decision means.

It has to be remarked that the wordings 'second association' doesn't mean that the MAC address should be found for a second time in the registration means. The 'second association' just means that a 'second kind of association' i.e. a 'second kind of entry' is to be look-up in the registration memory. More precisely the presence of a previous entry upon a pair (MAC address; any other port besides the port for which the request was received) is controlled by the second control means.

Finally, claim 4 describes that in the event when the first controlling step is negative and when the second controlling step is also negative, the method further comprises a step of inserting a new entry in the registration memory that comprises the Medium Access Control address of the supplicant e.g. SUP4 and the port of the authenticator e.g. P2; and a step of generating a result that comprises an authentication for the port and for the Medium Access Control address and thereby granting the supplicant with the Medium Access Control address to access the data communication network via the port of the authenticator. This means that when the two controlling steps are negative, the MAC address is not to be found in the registration memory and thereby no access was previously granted via one or another port to the supplicant. The supplicant is in such a situation using new hardware device having a new MAC address. This new MAC address has to be registered in association to the port of the supplicant. In the above mentioned examples, supplicant SUP1 being associated to the MAC1 address is now being associated with a new MAC2 address. The fact that port P1 was already part of an entry in the memory registration is irrelevant. As a result the memory registration can contain several MAC address associations with a same port. The present invention aims the fact that the MAC entry is not duplicated.

Furthermore, access is granted by means of generating by the decision means a result that comprises an authentication.

It is to be noticed that the term 'comprising', used in the claims, should not be interpreted as being limitative to the means listed thereafter. Thus, the scope of the expression 'a device comprising means A and B' should not be limited to devices consisting only of components A and B. It means that with respect to the present invention, the only relevant components of the device are A and B.

Similarly, it is to be noticed that the term 'coupled', also used in the claims, should not be interpreted as being limitative to direct connections only. Thus, the scope of the expression 'a device A coupled to a device B' should not be limited to devices or systems wherein an output of device A is directly connected to an input of device B. It means that there exists a path between an output of A and an input of B which may be a path including other devices or means.

The above and other objects and features of the invention will become more apparent and the invention itself will be best understood by referring to the following description of an embodiment taken in conjunction with the accompanying drawings wherein FIG. 1 represents a global communication network.

The working of the device according to the present invention in accordance with its telecommunication environment that is shown in FIG. 1 will be explained by means of a functional description of the different blocks shown therein. Based on this description, the practical implementation of the blocks will be obvious to a person skilled in the art and will therefor not be described in details. In addition, the principle working of the method to grant a supplicant access to a data communication network will be described in further detail.

Referring to FIG. 1, a global communication network is shown. The global communication network comprises two customer-premises-equipment i.e. first customer premises equipment CPE1 and second customer equipment CPE3; a data communication network DCN and an Authentication Server AS.

The first and second customer premises equipment CPE1 and CPE3 are each coupled to the data communication network DCN.

The Authentication Server AS is also coupled to the data communication network DCN.

The first customer premises equipment comprises three terminal units i.e. TU1, TU2, TU3 and a Network Unit NU1. The network unit NU1 is implemented in this preferred embodiment, however without any limitation to the basic idea of the invention, by means of a Router with MAC interface MAC1. The network unit NU1 comprises a supplicant SUP1. In this way is the supplicant SUP1 is associated to the MAC1 address of the network unit NU1.

The other customer equipment CPE3 comprises a Terminal Unit TU4. The terminal unit TU4 has a MAC address MAC4 and comprises a supplicant SUP4. In this way the supplicant SUP4 is associated to the MAC4 address of the network unit NU1.

The Data communication Network DCN comprises an Access Unit that comprises a plurality of ports. Two ports, P1 and P2, are explicitly shown. These two ports of the Access Unit are coupled to each one of the customer premises equipment. More in detail, the first customer premises equipment CPE1 is coupled via a first port P1 of the access unit AU to the data communication network DCN and the other customer premises equipment CPE3 is coupled via another port P2 of the access unit AU to the data communication network. The access unit AU comprises an authenticator AUTH1 that comprises a transmitter TX, a receiver RX and a filter FILT. The transmitter TX and the receiver RX are both coupled to the authentication server AS. The transmitter TX and the receiver RX are also coupled to the interpreter INTPR that on its turn is coupled to the filter FILT. According to this embodiment the filter FILT is also coupled to the different ports of the access unit AU. The coupling to the two ports P1 and P2 are explicitly shown in FIG. 1. The coupling to the other ports are only shown with a dotted line.

The Authentication server AS comprises a decider DEC which is coupled to an input/output of the authentication serverAS. The decided DEC comprises a first controller CONT1 and a second controller CONT2.

The authentication server AS further comprises a registration memory MEM that is coupled to an input/output of the authentication server AS and to the decider DEC.

The supplicants SUP1 and SUP4, the authenticator AUTH1 and the authentication server AS are enabled to communicate with each other to execute an authentication procedure and to thereby eventually grant the supplicant SUP1 or SUP2 access to the data communication network via the respective port of the authenticator.

This will now be explained in more detail.

Controlled and uncontrolled access is explained in the IEEE Standard 802.1X-2001, page 8. The operation of the Port-based access control has the effect of creating two distinct point of access (not shown in FIG. 1) to the authenticator System's point of attachment to the Local Area Network LAN. One point of access allows the uncontrolled exchange of packet data units, hereafter called PDU's, between the system and the other systems on the LAN, regardless of the authorizations state i.e. the uncontrolled port; the other point of access allows the exchange of PDU's only if the current state of the Port is authorized i.e. the controlled port. The uncontrolled and controlled Ports are considered to be part of the same point of attachment to the LAN e.g. port P1 for supplicant SUP1 in cooperation with authenticator AUTH1. Any frame received on the physical port is made available at both the controlled and uncontrolled ports; subject to Authorization State associated with the controlled port.

Furthermore, see also 802.1X-2001, page 8, last paragraph, the point of attachment to the LAN can be provided by any physical or logical port that can provide a one-to-one connection to a supplicant system. For example, the point of attachment could be provided by a single LAN MAC in a switched LAN infrastructure. In LAN environments where the MAC method allows the possibility of a one-to-many relationship between an authenticator and a supplicant, for example in shared media environments, the creation of a distinct association between a single supplicant and a single authenticator is a necessary precondition for the access control mechanisms described in 802.1X-2001 to function.

It has to be remarked, as explained above, that the functionality of different single authenticators, each associated to a distinct supplicant, can be integrated in one global authenticator taking care of the different supplicants. Such an implementation, with one integrated authenticator AUTH1, is preferred for particular embodiment. However, this is no limitation to the principle idea of the present invention.

The different roles in the access control mechanism of the two supplicants SUP1 and SUP4, the authenticator AUTH1 and the authentication server AS will now be explained.

The Authenticator AUTH1 uses the uncontrolled Port (not shown) for the purposes of exchanging protocol information with the supplicant and is further responsible for enforcing the authentication of one of the supplicants SUP1 or SUP4 that are attached to one of its controlled Ports, P1 or P4 respectively, and for controlling the authorization state of the respective controlled Port accordingly.

In order to perform the authentication, the Authenticator AUTH1 makes use of the Authentication Server AS. The Authentication Server AS may be collocated in the same System as the Authenticator AUTH1, or it may be located elsewhere, accessible via remote communication mechanisms, LAN-based or otherwise. This preferred embodiment describes an Authentication Server AS which is common to all authenticators of the same DCN. Indeed the MAC address duplicate is a problem that concerns the whole Ethernet communication network to which the authenticators are connected, and therefore it should be solved for the DCN as a whole. This is achieved by having the same AS for all the authenticators connected to the same Ethernet DCN.

The supplicant SUP1 or SUP4 is responsible for communicating its credentials to the Authenticator AUTH1 in response to requests from the Authenticator PAE. The Supplicant PAE may also initiate authentication exchanges and perform Logoff exchanges.

Authentication occurs primarily at System initialization time, or when a Supplicant System is connected to a Port of an Authenticator System. Until authentication has successfully completed, the Supplicant System only has access to the Authenticator System to perform authentication exchanges, or to access any services offered by the Authenticator's System that are not subject to the access control restrictions placed on the Authenticator's controlled Port. Once authentication has successfully completed, the Authenticator System allows full access to the services offered via the Authenticator System's controlled Port.

For this embodiment, it is preferred to define an encapsulation format that allows the authentication messages to be carried directly by a LAN MAC service. This encapsulated form of EAP, known as EAP over LANs, or EAPOL, is used for all communication between the Supplicants SUP1 and SUP4 and the Authenticator AUTH1. The Authenticator AUTH1 then performs a repackage of the EAP protocol for onward transmission to the Authentication Server AS. For this embodiment the RADIUS is preferred for providing this latter aspect of communication. However, it has to be remarked that this may be achieved by the use of other protocols.

Furthermore, once the authentication procedure is started, one of the following results can be generated:

a) The authentication procedure terminates due to excessive timeouts in the sequence of requests and responses. The aborting state is caused.
b) The authentication procedure terminates due to the Authentication Server AS returning a "Reject message" called herein "an authentication reply that comprises a result that comprises a refusal" to the Authenticator AUTH1.
c) The authentication procedure terminates due to the Authentication Server AS returning an "Accept message" to the Authenticator AUTH1, called herein "an authentication reply that comprises a result that comprises an authentication".

As it is explained above a supplicant e.g. SUP4 desires to receive a grant to access the data communication network DCN. The supplicant is also associated to the MAC4 address of the terminal unit TU4 and is coupled to a port P2 of the authenticator AU.

In order to acquire this grant the transmitter TX of the authenticator transmits an authentication request to the authentication server AS. The authentication server AS makes an authentication decision based upon predefined rules and conditions. Therefor the decider DEC of the authentication server AS is used. Hereafter, the authentication server AS transmits an authentication reply that comprises a result of the authentication decision, to the authenticator AUTH1.

However, in order to make the authentication decision for the supplicant SUP4, the authentication server AS also comprises, according to the present invention, a registration memory MEM. This registration memory MEM comprises entries. Such an entry comprises an association between a Medium Access Control address, such as MAC1 of a granted supplicant SUP1, and an authenticated port P1 being authenticated for this granted supplicant that already received a grant to access the data communication network DCN via this authenticated port P1.

The decider DEC generates the result RES of the authentication decision based upon predefined rules and conditions. However, the first controller CONT1 of the decider DEC also executes, according to the present invention, a first controlling step of controlling the registration memory MEM upon a presence of a previous entry that comprises a first association between the Medium Access Control address MAC4 of the supplicant SUP4 and the port of the authenticator P2.

This means that the Medium Access Control address MAC4 and the port of the Authenticator P2, which information is found in the authentication request, are extracted by the decider DEC from this Authentication request. The first controller CONT1 uses this information as input for the registration memory MEM. The registration memory MEM receives as input (MAC4, P2).

The registration memory MEM reacts on this input with an OK message which means that the pair-entry (MAC4, P2) was found in the registration memory MEM4, or a NOK message which means that the pair-entry (MAC4, P2) was not found in the registration memory MEM4. Such an Ok message or NOK message is taken into account by the decider DEC to generate a result RES.

The respective result of the authentication decision RES of the decider DEC is comprised in the authentication reply and is transmitted by the authentication server AS to the authenticator AUTH1.

The receiver RX of the authenticator AUTH1 receives from the authentication server AS the authentication reply.

The interpreter INTPR of the authenticator AUTH1 interprets the authentication reply as being received from an authentication server AS that is indeed enabled, according to the present invention, to support its authentication decision by means of such a first controlling step executed by a first controller CONT2. It has to be remarked that the interpreter is implemented by means of a decoder that decodes the authentication reply received from the authentication server AS.

The interpreter INTPR can be implemented in different ways. One possible way is that the interpreter INTPR knows according to a reference included in the authentication reply to which previous transmitted authentication request it is related and thereby to which supplicant e.g. SUP4 it concerns. The interpreter INTPR is enabled to retrieve based upon this supplicant SUP4 from a database of the authenticator AUTH1 the associated MAC address and port i.e. MAC4 and P2. Another possible implementation is that no authentication request database is kept and that the interpreter INTPR relies upon the information in the authentication reply. This means that the interpreter INTPR retrieves from the authentication reply the port and MAC address that is included in this authentication reply.

According to both possible implementations, the information i.e. the concerned MAC address and the port i.e. in the example MAC4 and P2, is forwarded to the filter FILT. The filter FILT is set according to the information that is comprised in the authentication reply and on its turn, the filter FILT filters the traffic for port P2 accordingly. This means that:

in the event when the result RES(AUTH) comprises an authentication for the port P2 and for the MAC4 address, whereby the supplicant SUP4 with the MAC4 address is indeed granted to access the data communication network DCN via the port P2 of the authenticator AU, the filter FILT accepts traffic of the supplicant SUP4 via the port P2, but only for the MAC4 address wherefore the authorization was given; and in the event when the result RES(REF) comprises a refusal for the port P2 and for the MAC4 address whereby the supplicant SUP4 with MAC4 address is denied to access the data communication network DCN via the port P2 of the authenticator AU, the filter FILT refuses traffic of the supplicant SUP4 with MAC4 address.

It has to be remarked that the filter FILT can be implemented by means of one filter block for every port of the authenticator AUTH1 or it can be implemented as one centralized functional block that controls the traffic over the different ports of the authenticator AUTH 1.

By taking into account a potential earlier grant for a pair (MAC address, port)—relation during the authentication decision of the decider DEC, and by setting the port P2 of the authenticator AUTH1 for the requesting supplicant SUP4 accordingly i.e. allowing traffic, in the event of authentication result, only for the MAC address MAC4 for which the authorization was provided, the granting of access for duplicated MAC address is avoided and malicious users are anticipated.

In the following paragraphs the first controlling step will further be explained and a second controlling step will be introduced.

In the event when the first controlling step is positive, this means that an entry (MAC4, P2) is found in the registration memory MEM4 (not shown in FIG. 1), the decider DEC generates a result RES(AUTH) that comprises an authentication for the port P2 and for the MAC4 address, whereby the supplicant SUP4 with the MAC4 address is granted to access the data communication network DCN via the port P2 of the authenticator AU.

In the event when the first control is negative, this means that an entry (MAC4, P2) is not found in the registration memory MEM4 (not shown in FIG. 1), the decider DEC comprises a second controller CONT2 to execute a second control on the registration memory MEM upon a presence of a previous entry that comprises a second kind of association between the MAC address MAC4 of the supplicant SUP4 with another port, i.e. a pair (MAC4; any other port besides the one in the authorization request). In the event when the second control is positive, the decider DEC generates a result RES(REF) that comprises a refusal for the port P2 and for the MAC4 address, whereby the supplicant SUP4 with the MAC4 address is denied to access the data communication network DCN via the port P2 of the authenticator AU.

It has to be remarked that the second controller CONT2 can be implemented as another functional block as the first controller CONT1. However, it has to be explained that both controllers can be implemented by means of one and the same functional block. According to such an implementation, the parameters that are used by such a global controller are defined in a different way depending from the controlling step that has to be executed different i.e. first controlling step with e.g. (MAC4, P2) as input or second controlling step with e.g. (MAC4, any other port besides P2).

Furthermore, it has to be explained that both controlling steps can also be implemented by execution of one global controlling step that provides in stead of an OK message or an Not OK message, a more detailed feedback such as e.g. (MAC OK; P2 NOK) which would mean that MAC4 is found in the registration memory MEM in relation with such an other port. However, the detailed description of the different ways of implementation goes beyond the aim of the present invention.

In the event when the first control is negative and in the event when the second control is negative, the authentication server AS inserts a new entry in the registration memory MEM that comprises the MAC4 address of the supplicant SUP4 and the port of the authenticator P2. Furthermore, the decider DEC generates a result RES(AUTH) that comprises an authentication for the port P2 and for the Medium Access Control address MAC4 whereby the supplicant SUP4 with the MAC4 address is granted to access the data communication network DCN via the port P2 of the authenticator AU.

A final remark is that embodiments of the present invention are described above in terms of functional blocks. From the functional description of these blocks, given above, it will be apparent for a person skilled in the art of designing electronic devices how embodiments of these blocks can be manufactured with well-known electronic components. A detailed architecture of the contents of the functional blocks hence is not given.

While the principles of the invention have been described above in connection with specific apparatus, it is to be clearly understood that this description is made only by way of example and not as a limitation on the scope of the invention, as defined in the appended claims.

The invention claimed is:

1. A method to grant a supplicant access to a data communication network, said supplicant having associated a Medium Access Control address and being coupled to an ingress port of an authenticator of said data communication network,
said method comprises:
transmitting an authentication request by said authenticator to an authentication server being coupled thereto; and
making by said authentication server an authentication decision based upon predefined rules and conditions; and
transmitting by said authentication server to said authenticator an authentication reply that comprises a result of said authentication decision, characterized in that said method further comprises
developing by said authentication server a registration memory (MEM) that comprises entries whereby an entry comprises an association between a Medium Access Control address of a granted supplicant and an authenticated ingress port for said granted supplicant that already received a grant to access an allowed data communication network via said authenticated ingress port; and that said predefined rules and conditions comprises a first controlling step of controlling said registration memory if there exists a first previous entry that comprises a first association between said Medium Access Control address of said supplicant and said ingress port of said authenticator,
wherein in the event that said first previous entry does not exist, said method further comprises:
a second controlling step of controlling said registration memory if there exists a second previous entry that comprises a second association between said Medium Access Control address of said supplicant with another ingress port,
wherein the first controlling step and the second controlling step are different operations.

2. The method to grant a supplicant access to a data communication network according to claim 1, wherein in the event that the first previous entry exists, said method further comprises
generating a result that comprises an authentication for said ingress port and for said Medium Access Control address and thereby granting said supplicant with said Medium Access Control address to access said data communication network via said ingress port of said authenticator.

3. The method to grant a supplicant access to a data communication network according to claim 1,
wherein in the event that the second previous entry exists, said method further comprises generating a result that comprises a refusal for said ingress port and for said Medium Access Control address and denying said supplicant with said Medium Access Control address access to said data communication network via said ingress port of said authenticator.

4. The method to grant a supplicant access to a data communication network according to claim 3, whereby
in the event that said first previous entry and said second previous entry do not exist, said method further comprises
inserting a new entry in said registration memory that comprises said Medium Access Control address of said supplicant and said ingress port of said authenticator; and
generating a result that comprises an authentication for said ingress port and for said Medium Access Control address and thereby granting said supplicant with said Medium Access Control address to access said data communication network via said ingress port of said authenticator.

5. An authentication server to transmit to an authenticator, upon reception of an authentication request from said authenticator, an authentication reply that comprises a result of an authentication decision said authentication server comprises:
a decision module, wherein said decision module generates said result of the authentication decision being based upon predefined rules and conditions, said authentication request concerns a permission to grant for a supplicant access to a data communication network, said supplicant having associated a Medium Access Control address and being coupled to a ingress port of said authenticator of said data communication network, characterized in that said authentication server further comprises
- a registration memory device coupled to said decision module, said registration memory comprises entries whereby an entry comprises an association between a Medium Access Control address of a granted supplicant and an authenticated ingress port for said granted supplicant that already received a grant to access an allowed data communication network via said authenticated ingress port; and
- that said decision module comprises a first control module to execute a first control on said registration memory is there exists a first previous entry that comprises a first association between said Medium Access Control address of said supplicant and said ingress port of said authenticator,
- wherein in the event that said first previous entry does not exist, said decision module comprises a second control module to execute a second control on said registration memory if a second previous entry exists that comprises a second association between said Medium Access Control address of said supplicant with another ingress port,
- wherein the first control on said registration memory is different from said second control on said registration memory.

6. The authentication server according to claim 5, wherein in the event that said first previous entry exists,
- said decision module generates a result that comprises an authentication for said ingress port and for said Medium Access Control address whereby said supplicant with said Medium Access Control address being granted to access said data communication network via said ingress port of said authenticator.

7. The authentication server according to claim 5, whereby in the event when said second control is positive,
- said decision module generates a result that comprises a refusal for said ingress port and for said Medium Access Control address whereby said supplicant with said Medium Access Control address is denied access to said data communication network via said ingress port of said authenticator.

8. The authentication server according to claim 7, wherein in the event that said first previous entry does not exist; and in the event that said second previous entry does not exist;
- the authentication server inserts a new entry in said registration memory that comprises said Medium Access Control address of said supplicant and said ingress port of said authenticator; and
- said decision module generates a result that comprises an authentication for said ingress port and for said Medium Access Control address whereby said supplicant with said Medium Access Control address being granted to access said data communication network via said ingress port (P2) of said authenticator.

9. An authenticator that enables a supplicant access to a data communication network, said supplicant having associated a Medium Access Control (MAC) address and being coupled to a ingress port of said authenticator of said data communication network,
said authenticator therefor comprises
- a transmitter device to transmit an authentication request to an authentication server being coupled to said authenticator; and
- a receiver to receive from said authentication server an authentication reply that comprises a result of an authentication decision based upon predefined rules and conditions, characterized in that
- said authenticator comprises an interpreter, wherein said interpreter interprets said authentication reply as being received from the authentication server and to set a filter of said authenticator accordingly, whereby
- when said result comprises an authentication for said ingress port and for said Medium Access Control address whereby said supplicant with said Medium Access Control address is granted access to said data communication network via said ingress port of said authenticator, said filter accepts traffic of said supplicant via said ingress port only for said Medium Access Control address; and whereby
- when said result comprises a refusal for said ingress port and for said Medium Access Control address whereby said supplicant with said Medium Access Control address is denied access to said data communication network via said ingress port of said authenticator, said filter refuses traffic of said supplicant,
- wherein said ingress port and said MAC are authenticated if there exists an entry, in a memory, that comprises an association between said ingress port and said MAC.

\* \* \* \* \*